(12) United States Patent
Miyagawa (10) Patent No.: US 10,746,529 B1
(45) Date of Patent: Aug. 18, 2020

(54) OPTICAL DISPLACEMENT METER

(71) Applicant: Keyence Corporation, Osaka (JP)

(72) Inventor: Yutaka Miyagawa, Osaka (JP)

(73) Assignee: Keyence Corporation, Osaka (JP)

(*) Notice: Subject to any disclaimer, the term of this patent is extended or adjusted under 35 U.S.C. 154(b) by 0 days.

(21) Appl. No.: 16/823,364

(22) Filed: Mar. 19, 2020

(30) Foreign Application Priority Data

Apr. 26, 2019 (JP) .................................. 2019-085200

(51) Int. Cl.
*G01B 11/02* (2006.01)
*G01B 11/00* (2006.01)

(52) U.S. Cl.
CPC .......... *G01B 11/026* (2013.01); *G01B 11/002* (2013.01)

(58) Field of Classification Search
CPC .... G01B 11/002; G01B 11/026; G01B 11/285
USPC ......................................................... 356/614
See application file for complete search history.

(56) References Cited

U.S. PATENT DOCUMENTS

| | | | |
|---|---|---|---|
| 2019/0078875 A1* | 3/2019 | Chida | .................. G01B 11/285 |
| 2020/0049487 A1 | 2/2020 | Tsuchida | |
| 2020/0049490 A1 | 2/2020 | Tsuchida | |

FOREIGN PATENT DOCUMENTS

| | | |
|---|---|---|
| JP | 200896125 A | 4/2008 |
| JP | 2012103266 A | 5/2012 |

OTHER PUBLICATIONS

U.S. Appl. No. 16/823,363, filed Mar. 19, 2020 (40 pages).
U.S. Appl. No. 16/823,365, filed Mar. 19, 2020 (52 pages).
U.S. Appl. No. 16/823,366, filed Mar. 19, 2020 (83 pages).

* cited by examiner

*Primary Examiner* — Hung Nguyen
(74) *Attorney, Agent, or Firm* — Kilyk & Bowersox, P.L.L.C.

(57) ABSTRACT

To suppress an erroneous measurement of a measuring object in an optical displacement meter of a light sectioning method. The optical displacement meter includes an image sensor, a cover glass arranged obliquely relative to a light receiving surface of the image sensor, and a housing which houses the image sensor and the cover glass.

7 Claims, 10 Drawing Sheets

OPTICAL DISPLACEMENT METER

CROSS-REFERENCE TO RELATED APPLICATIONS

The present application claims foreign priority based on Japanese Patent Application No. 2019-085200, filed Apr. 26, 2019, the contents of which are incorporated herein by reference.

BACKGROUND OF THE INVENTION

1. Field of the Invention

The present invention relates to an optical displacement meter.

2. Description of Related Art

An optical displacement meter of a light sectioning method has been proposed in order to measure a height in a Z direction of a measuring object (workpiece) conveyed in a Y direction by a conveyor (JP-A-2008-096125, JP-A-2012-103266).

A direction orthogonal to the Y direction and the Z direction is an X direction, and the workpiece is placed on an XY plane. The optical displacement meter irradiates the workpiece with slit light having a width in the X direction, and receives reflected light from the workpiece with an image sensor arranged two-dimensionally. A light projecting direction of the slit light and a light receiving direction of the image sensor are inclined, and the height of the workpiece is calculated based on a principle of triangulation. Such an optical displacement meter of the light sectioning method can acquire a contour (profile) of an X-Z cross section of the workpiece at once. By repeatedly performing imaging while conveying the workpiece in the Y direction, profiles at different positions in the Y direction are acquired. Further, data indicating a three-dimensional shape of the workpiece is obtained from a plurality of profiles.

SUMMARY OF THE INVENTION

By the way, a cover glass for protecting a plurality of photoelectric converting elements (pixels) is attached to a light receiving surface side of the image sensor. Since the light receiving surface and the cover glass are close to each other, strong reflected light may be multiple-reflected between the light receiving surface and the cover glass. In this case, reflected light that has been multiple-reflected is incident on a pixel onto which reflected light should not have been incident, and an erroneous measurement of the height of the workpiece occurs. Therefore, an object of the invention is to suppress an erroneous measurement of a measuring object in an optical displacement meter of a light sectioning method.

The invention provides, for example, an optical displacement meter of a light sectioning method which measures a profile of an X-Z cross section of a measuring object conveyed in a Y direction based on a principle of triangulation, the optical displacement meter including: a light source which irradiates the measuring object with slit light having a width in an X direction; an image sensor that receives reflected light from the measuring object via a light receiving lens, the image sensor having a plurality of pixels two-dimensionally arranged in a U direction corresponding to the X direction and a V direction corresponding to a Z direction, and outputting a light receiving amount of the reflected light by the plurality of pixels; a cover glass which is arranged separated from the image sensor and is arranged obliquely relative to a light receiving surface of the image sensor; a housing which houses the image sensor and the cover glass; a detecting unit which detects, as a peak position, a position of a pixel in the V direction that is a peak of the light receiving amount for each of a plurality of pixel rows arranged in the U direction; and a generating unit which generates a profile of the X-Z cross section from each position of the plurality of pixel rows in the U direction and the peak position in the V direction.

According to the invention, the erroneous measurement of the measuring object in the optical displacement meter of the light sectioning method is suppressed.

DESCRIPTION OF EMBODIMENTS

Embodiments will be described in detail below with reference to the attached drawings. The following embodiments are not intended to limit the invention according to the claims, and all combinations of features described in the embodiments are not necessarily essential to the invention. Two or more features of a plurality of features described in the embodiments may be arbitrarily combined. In addition, same or similar components are given the same reference numeral, and redundant description is omitted.

<Optical Displacement Meter>

Figure 1:
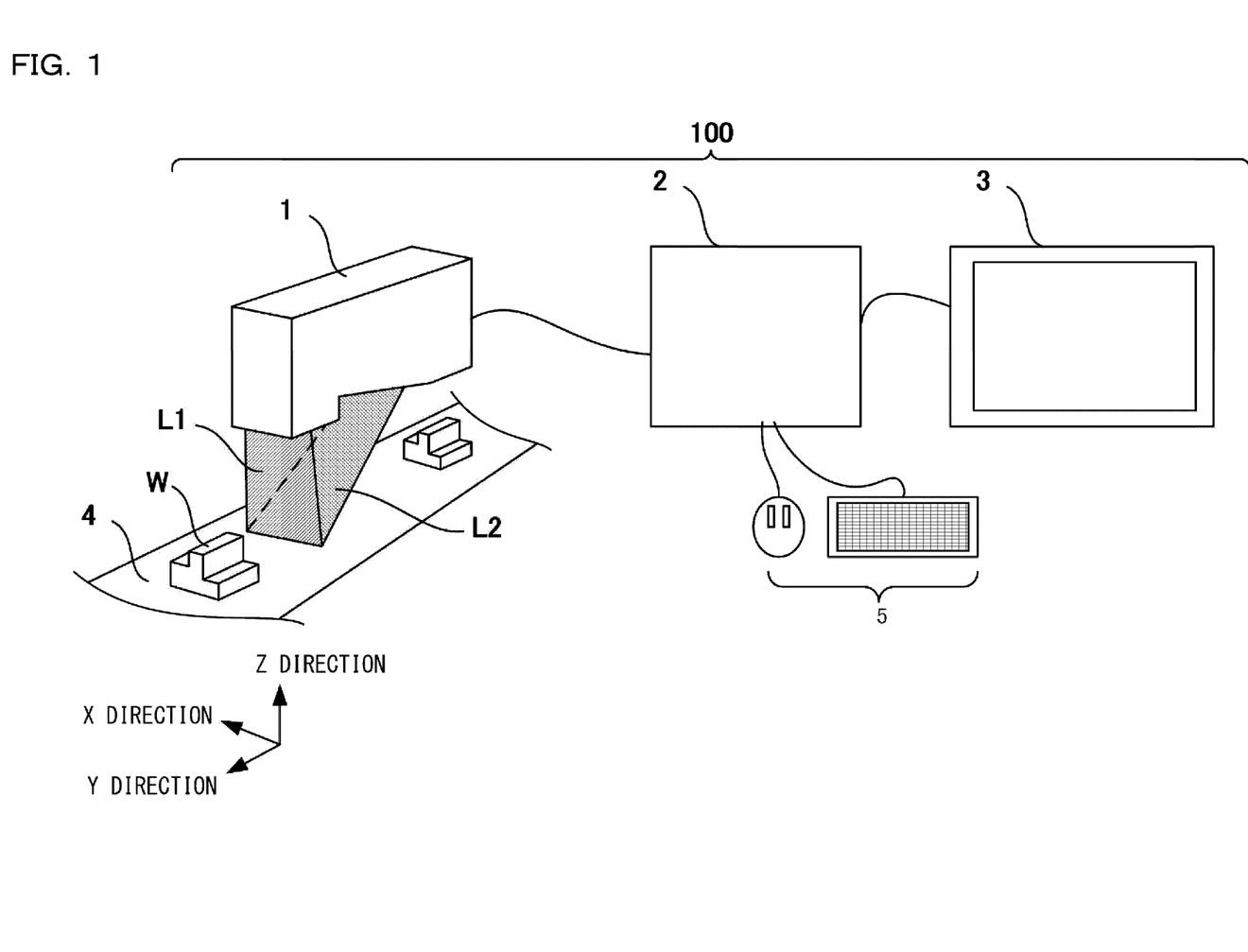
FIG. 1 is a diagram illustrating an optical displacement meter.

FIG. 1 is a diagram showing an optical displacement meter 100. The optical displacement meter 100 is an apparatus that measures a profile and a three-dimensional shape of a workpiece W conveyed in a Y direction by a belt conveyor 4. In this example, a Z direction corresponds to a height direction of the workpiece W. A head section 1 outputs slit light L1 parallel to an XZ plane and receives reflected light L2 from the workpiece W, thereby outputting a light receiving result to a control section 2. The control section 2 calculates a profile of the workpiece W based on the light receiving result output from the head section 1. The control section 2 may be integrated with the head section 1. The profile is data indicating an outer edge of a cut surface of the workpiece W parallel to the XZ plane. For example, the profile is an aggregate of (xi, zi) (i is an index). The xi indicates a position in the X direction. The zi indicates a height in the Z direction. The three-dimensional shape is an aggregate of (xi, yi, zi). The yi indicates a position in the Y direction. The control section 2 obtains profiles (xi, zi) of the workpiece W having different yis by causing the head section 1 to perform imaging at regular intervals. A display device 3 displays a measurement result of the workpiece W by the optical displacement meter 100, and displays a UI (user interface) for performing a setting of the optical displacement meter 100. An operating section 5 is an input device for receiving a user input to the optical displacement meter 100.

<Principle of Three-Dimensional Distance Measurement>

Figure 2:
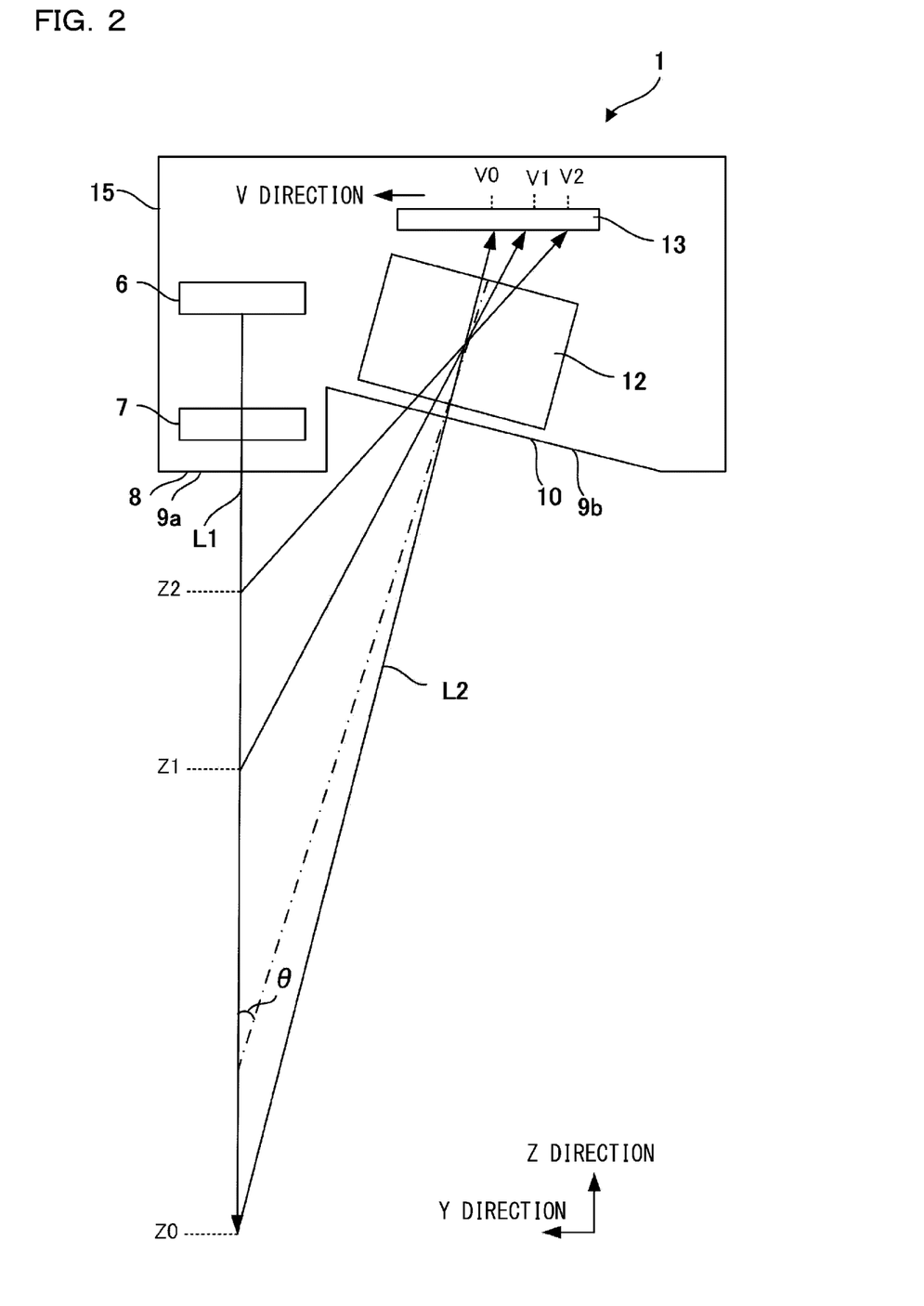
FIG. 2 is a diagram illustrating the principle of triangulation.

FIG. 2 is a diagram illustrating a principle of a light sectioning method (triangulation). A light source 6, a light projecting lens 7, a light receiving lens 12, and an image sensor 13 are integrated inside a housing 15 of the head section 1. Light output from the light source 6 is converted into the slit light L1 by passing through the light projecting lens 7. A light transmitting window 8 through which the slit light L1 passes is provided on the housing 15. A light transmitting glass 9a for dust proof is provided on the light transmitting window 8. Similarly, a light receiving window 10 for guiding the reflected light L2 into the interior of the housing 15 is provided on the housing 15. A light transmitting glass 9b for dust proof is provided on the light receiving window 10. The light receiving lens 12 is a lens for forming an image of the reflected light L2 on the image sensor 13. The image sensor 13 is a sensor having a plurality of pixels (which may be called light receiving elements or photoelectric converting elements) arranged two-dimensionally. As shown in FIG. 2, a light receiving axis of the image sensor 13 is inclined by an angle θ relative to a light projecting axis of the light source 6. That is, the reflected light L2 from a height Z0 forms an image at a position of V0 in the V direction of the image sensor 13. The reflected light L2 from a height Z1 forms an image at a position of V1 in the V direction of the image sensor 13. The reflected light L2 from a height Z2 forms an image at a position of V2 in the V direction of the image sensor 13. In this way, the V direction of the image sensor 13 corresponds to the Z direction of the workpiece W. Although the U direction of the image sensor 13 is not shown, the U direction corresponds to the X direction of the workpiece W. In a word, a vertical direction of an image which is a light receiving result output by the image sensor 13 is the V direction, and a lateral direction is the U direction.

The light source 6 is arranged such that the slit light L1 is output in the Z-axis direction in FIG. 2. However, the positional relation between the pair of the light source 6 and the light projecting lens 7, and the pair of the image sensor 13 and an imaging lens 12 may be reversed.

Figure 3:
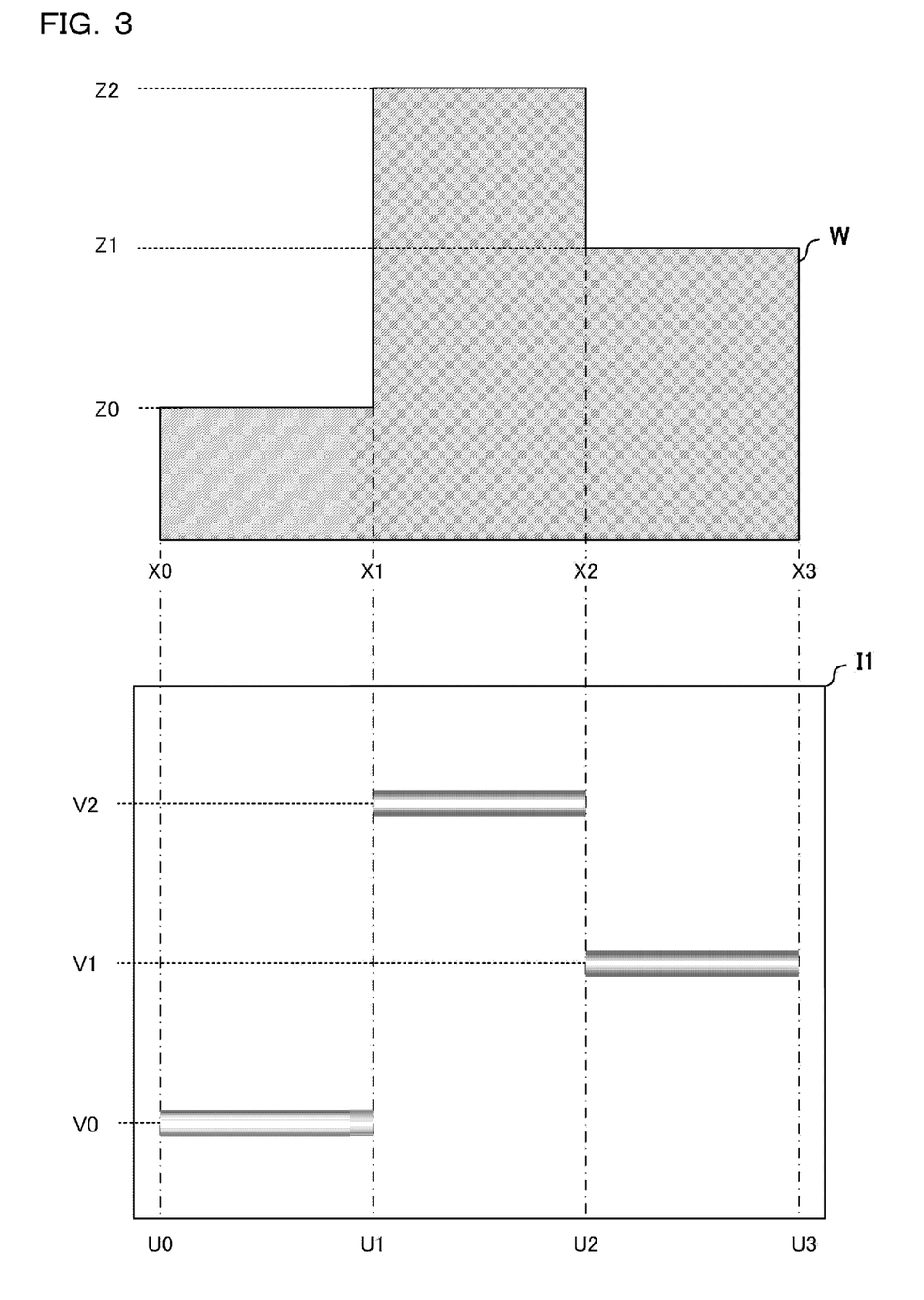
FIG. 3 is a diagram illustrating a measurement of a profile.

FIG. 3 is a diagram illustrating a relation between an image I1 output by the image sensor 13 and a cross section of the workpiece W. In this example, the height in the XZ cross section of the workpiece W changes in three stages. More specifically, the height from position X0 to position X1 in the X direction is Z0. The height from the position X1 to position X2 is Z2. The height from the position X2 to position X3 is Z1. The image I1 is an image obtained by imaging such a workpiece W with the head section 1. The U direction (lateral direction) of the image I1 corresponds to the X direction of the workpiece W. That is, positions U0, U1, U2, and U3 of the image I1 correspond to positions X0, X1, X2, and X3, respectively. Similarly, positions V0, V1, and V2 in the V direction of the image I1 correspond to heights Z0, Z1, and Z2, respectively. A light spot (an aggregate of reflection positions) formed by the incidence of the slit light L1 on the XY plane is linear. That is, when the workpiece W is not present on the belt conveyor 4, substantially linear light spots are arranged on the image output by the head section 1. On the other hand, generally a height of an edge of a cut surface of the workpiece W is often not constant. In this case, as shown in FIG. 3, the light spots are arranged at positions in the V direction corresponding to each of a plurality of heights. FIG. 2 shows that the position in the V direction changes corresponding to the height. The control section 2 generates a profile by calculating a position in the V direction for each position in the U direction from an image IM acquired at a position in a certain Y direction. Since there is a certain scale relation between the XZ coordinate system and the UV coordinate system, the control section 2 can convert a profile in the UV coordinate system into a profile in the XZ coordinate system by a simple calculation.

<Position (Height Calculation)>

Figure 4:
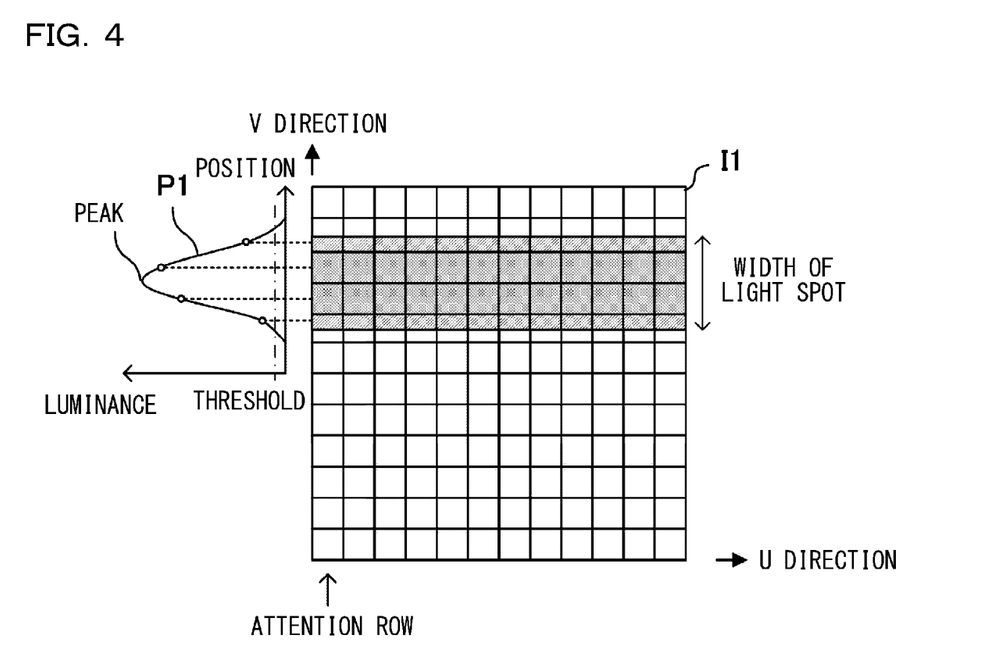
FIG. 4 is a diagram illustrating a method of detecting a peak position.

FIG. 4 is a diagram illustrating a method of calculating a height included in the profile from the image I1. The slit light L1 has a certain width in the Y direction. For this reason, the width of the light spot brought by the reflected light L2 to the image sensor 13 also becomes a width that extends over a plurality of pixels. Therefore, the control section 2 obtains an approximate curve P1 indicating a change in the luminance value from the luminance value of each pixel, and calculates a position in the V direction which brings a peak value in the approximate curve P1. In FIG. 4, the leftmost row is an attention row, and a distribution of the luminance values of the attention row (the approximate curve P1) is illustrated. The approximate curve P1 is obtained by performing curve fitting on a plurality of sample values and the like. A sample value which is smaller than a detection threshold is not considered. The position in the V direction which brings the peak value indicates the height of the workpiece W. The control section 2 obtains the approximate curve P1 for each position (each pixel row) in the U direction, and calculates a position (height) in the V direction that brings a peak value from the approximate curve P1. By executing the arithmetic processing at each position in the U direction, one profile is obtained. Such arithmetic processing may be called sub-pixel processing.

<Internal Function>

Figure 5:
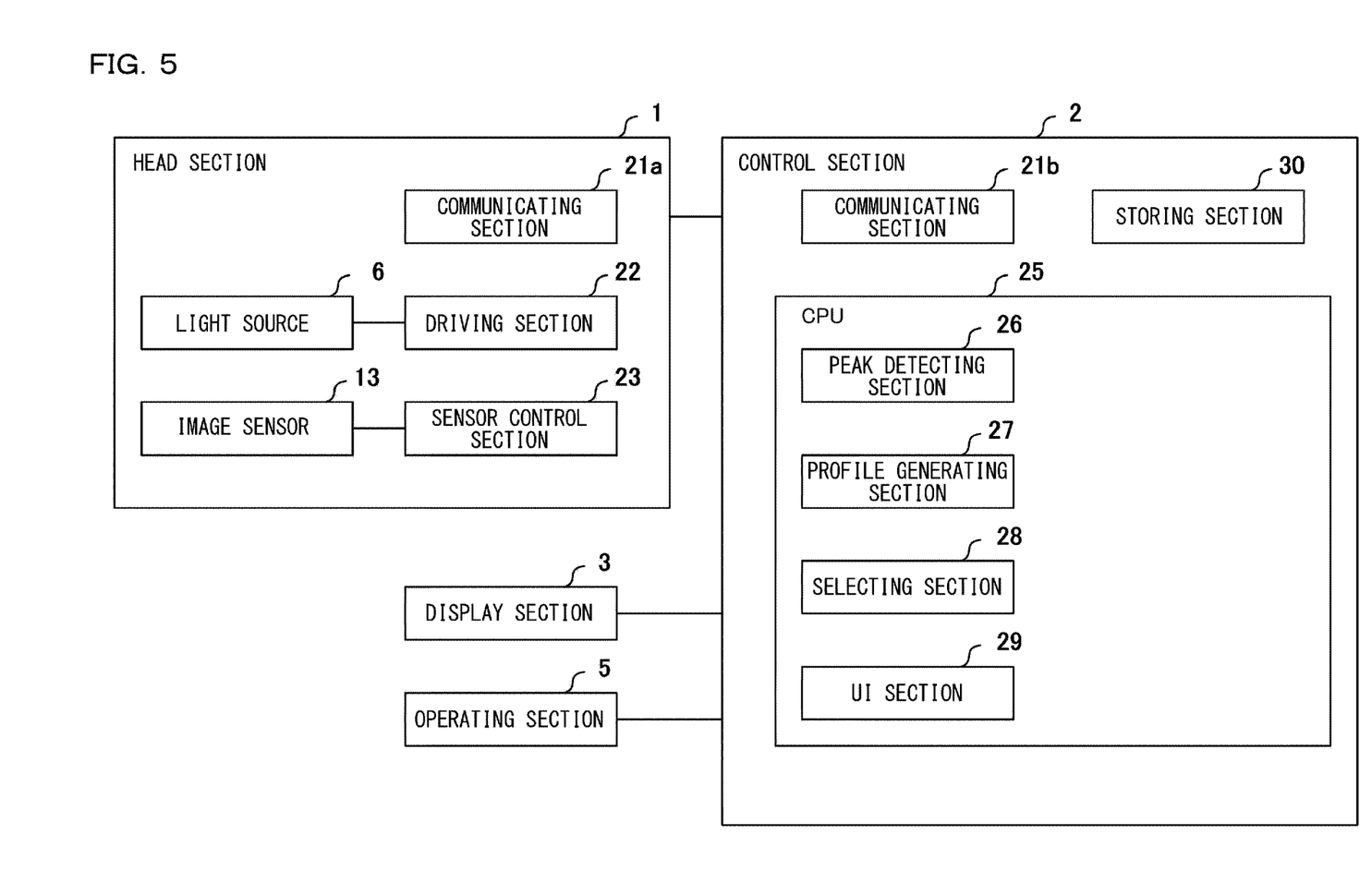
FIG. 5 is a block diagram illustrating functions included in the optical displacement meter.

FIG. 5 shows internal functions of the optical displacement meter 100. A communicating section 21a of the head section 1 is a communication circuit for communicating with the control section 2. A driving section 22 is a driving circuit that turns on the light source 6 by supplying a driving current to the light source 6 according to an instruction from the control section 2 received via the communicating section 21a. A sensor control section 23 is a control circuit that causes the image sensor 13 to perform imaging with a predetermined exposure time according to an instruction from the control section 2 received via the communicating section 21a. In the present embodiment, the sensor control section 23 causes the image sensor 13 to execute predetermined binning according to an instruction from the control section 2 received via the communicating section 21a.

A communicating section 21b of the control section 2 is a communication circuit for communicating with the head section 1. A CPU 25 controls the head section 1 by executing a control program stored in a storing section 30, and measures a profile and a three-dimensional shape of the workpiece W based on a light receiving result output from the head section 1. A peak detecting section 26 detects a position (peak position) in the V direction which brings a peak of a luminance value based on the light receiving result output by the image sensor 13. The peak position corresponds to the height of the workpiece W. In a word, the peak detecting section 26 obtains a height of the workpiece W at each position in the X direction by calculation. A profile generating section 27 generates one profile data by collecting the height (zi) of the workpiece W for each position (xi) in the X direction obtained by the peak detecting section 26. That is, one profile data is an aggregate of a plurality of heights (zi). The profile generating section 27 obtains profile data for different positions (yi) in the Y direction, and generates data indicating a three-dimensional shape of the workpiece W from the obtained plurality of profile data. The data of the three-dimensional shape of the workpiece W is an aggregate of the obtained plurality of profile data. A selecting section 28 selects a binning ratio, which will be described later, based on a user instruction input from the operating section 5. A UI section 29 displays the profile data obtained by the profile generating section 27 or the image I1 on the display device 3, and displays a UI for selecting a binning ratio on the display device 3.

<Dust Proof Measures>

Figure 6A:
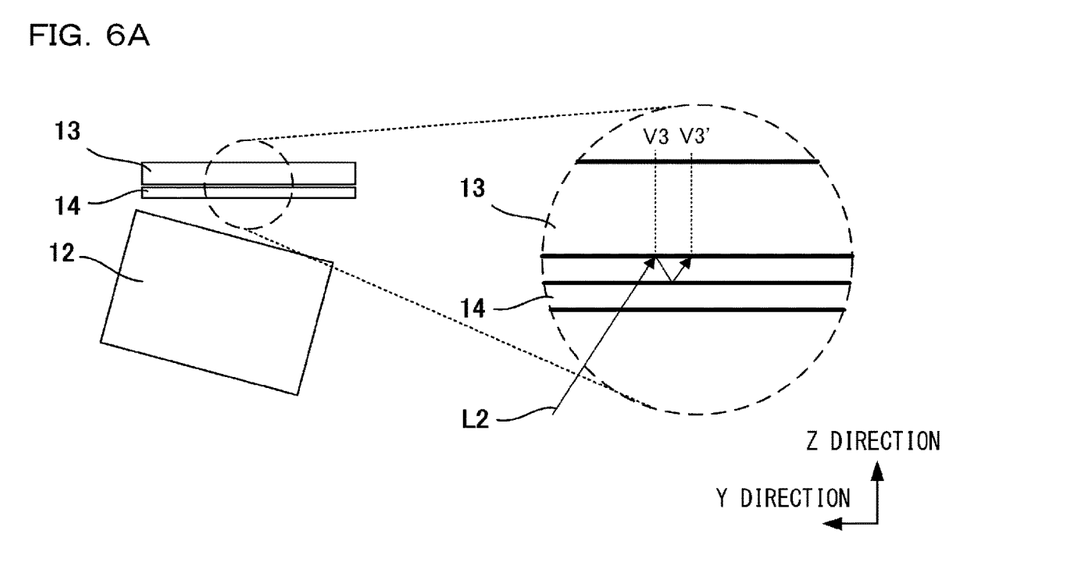
FIGS. 6A and 6B each is a diagram illustrating a relation between a cover glass and multiple reflection.

FIG. 6A is a diagram illustrating a dustproof structure of the image sensor 13. When dust adheres to any of the pixels included in the image sensor 13, the dust is reflected in the image. The dust reflected in the image causes an error in the measurement result of the workpiece W. Therefore, a cover glass 14 is fixed to the light receiving surface side of the image sensor 13. The cover glass 14 covers the light receiving surface of the image sensor 13, and thus no dust adheres to the light receiving surface.

In order to improve the accuracy of triangulation, it is important that the light source 6, a main surface of the light receiving lens 12, and the light receiving surface of the image sensor 13 satisfy a Scheimpflug condition. When the Scheimpflug condition is satisfied, in an image generated by the image sensor 13, both a high portion and a low portion in the workpiece W are focused (Scheimpflug principle). The Scheimpflug condition is an important condition in determining the height of the workpiece W from the image.

On the other hand, when the image sensor 13 is arranged so as to satisfy the Scheimpflug condition, the reflected light L2 may be multiple-reflected between the light receiving surface of the image sensor 13 and the cover glass 14. In such a case, as shown in FIG. 6A, a peak of the light receiving amount occurs not only at the position V3 but also at the position V3'. It is a major problem which of the two peaks the peak detecting section 26 is to select. For example, the CPU 25 may allow the user to select one of a setting that gives priority to a peak (V3') at a nearer side to the head section 1 and a setting that gives priority to a peak (V3) at a farther side to the head section 1. However, it is not easy for the user to correctly select the nearer side and the farther side. The user cannot make a correct selection unless the user fully understands features of the surface of the workpiece W and features of the optical displacement meter 100, and has accumulated considerable measurement experiences.

Figure 10:
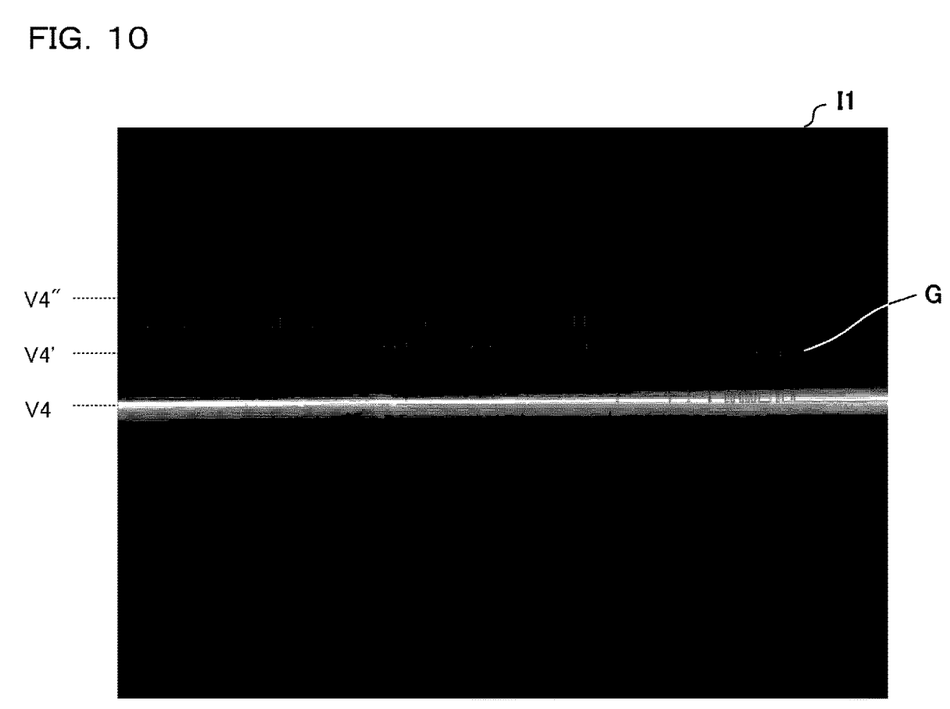
FIG. 10 is a diagram illustrating a plurality of peaks caused by multiple reflection.

FIG. 10 shows a case where multiple reflection occurs and priority is given to the peak at the farther side. In this example, an original peak occurs at position V4. However, false peaks also occur at position V4' and position V4". When the peak at the nearer side is selected in this case, as shown by the peak determination result G in FIG. 10, a false peak may be selected. Therefore, it is necessary to have a structure of the head section 1 that can obtain a more accurate measurement result without imposing a burden on the user.

Figure 6B:
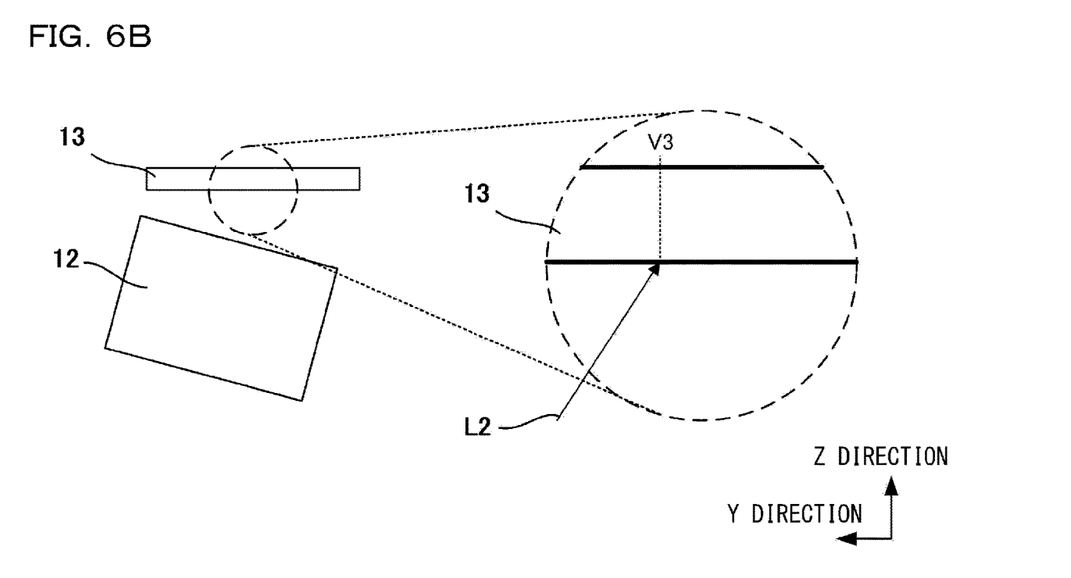

FIG. 6B shows the image sensor 13 from which the cover glass 14 has been removed. Since the cover glass 14 which caused multiple reflection is not present, a false peak does not occur. In addition, since the cover glass 14 is not present, a dustproof function replacing the cover glass 14 becomes necessary. This can be achieved, for example, by making the housing 15 itself a sealed structure (dustproof structure). The sealed structure refers to a structure capable of preventing air from entering into the interior of the housing 15 from outside the housing 15.

Figure 7:
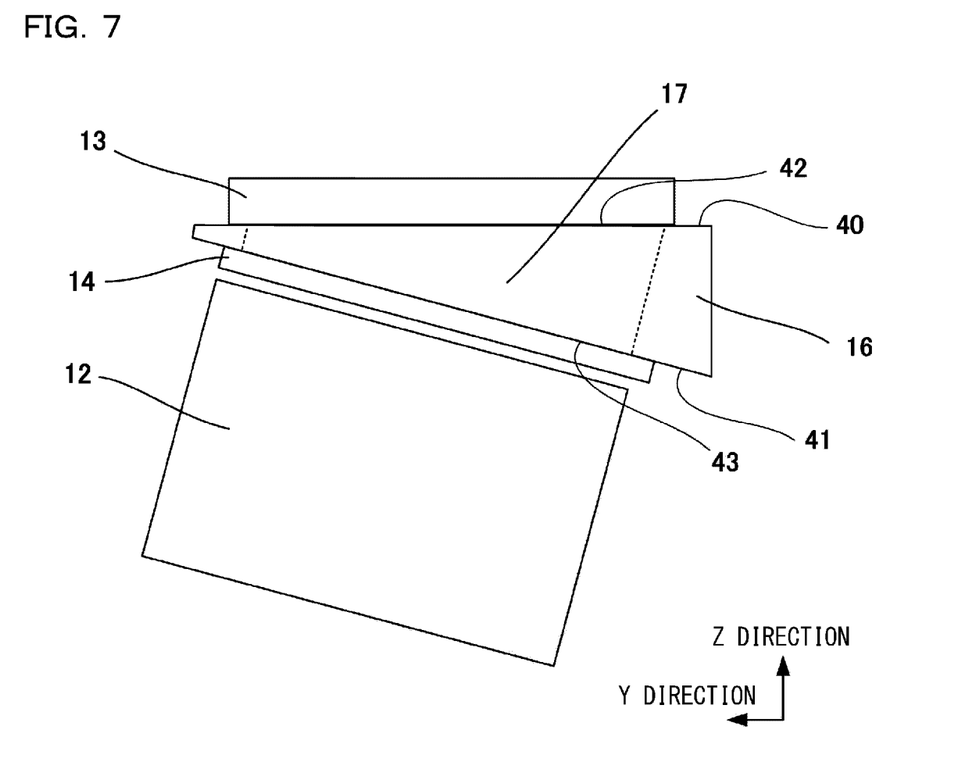
FIG. 7 is a diagram illustrating a sealed structure using a supporting member.

FIG. 7 is a diagram showing another dustproof structure. In this example, a dustproof structure including a supporting member 16 having a wedge-shaped cross section and the cover glass 14 is adopted. The supporting member 16 has a top surface 40 facing the image sensor 13 and coupled to an edge portion of the image sensor 13, and a bottom surface 41 to which the cover glass 14 is attached. The top surface 40 is parallel to the light receiving surface of the image sensor 13, while the bottom surface 41 is inclined relative to the light receiving surface of the image sensor 13. The cover glass 14 is a flat plate and is parallel to the main surface of the light receiving lens 12. A space 17 through which the reflected light L2 passes is provided at the center of the supporting member 16. The space 17 is a through hole communicating from an opening 43 provided on the bottom surface 41 to an opening 42 provided on the top surface 40. As a result, the light receiving surface of the image sensor 13 is sealed by the supporting member 16 and the cover glass 14, and thus dust is less likely to enter the light receiving surface. In addition, since the light receiving surface of the image sensor 13 and the cover glass 14 are not close to each other, multiple reflection hardly occurs.

As described above, the cover glass originally attached to the surface of the image sensor 13 is removed from the image sensor 13 and is provided at a position on a side of the supporting member 16 which supports the image sensor 13 facing the light receiving lens 12. As a result, it is possible to prevent dust from adhering to the image sensor 13 and to effectively prevent multiple reflection between the cover glass 14 and the image sensor 13.

<Posture Adjusting Hole>

Figure 8A:
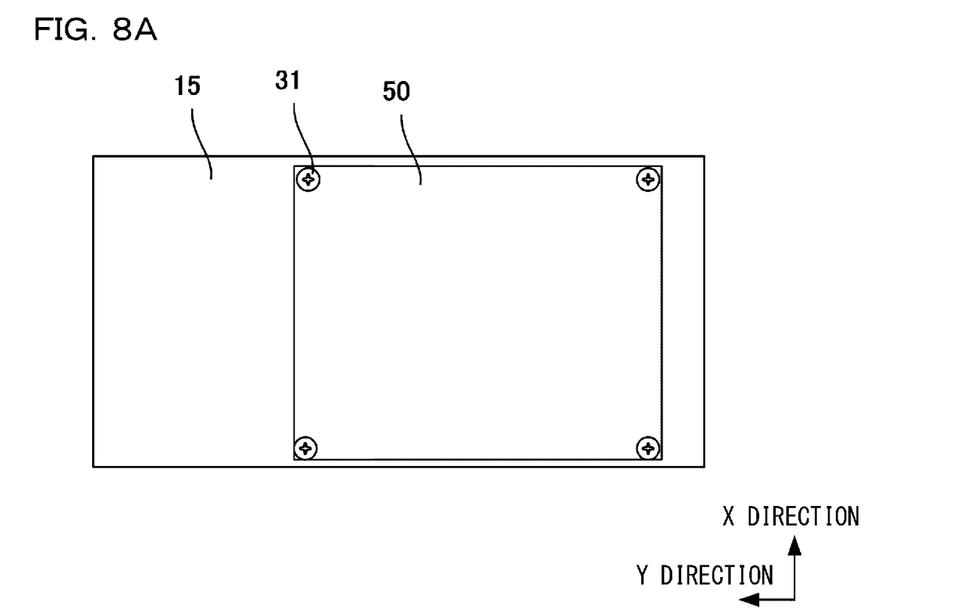
FIGS. 8A and 8B each is a diagram illustrating a posture adjusting mechanism.
Figure 8B:
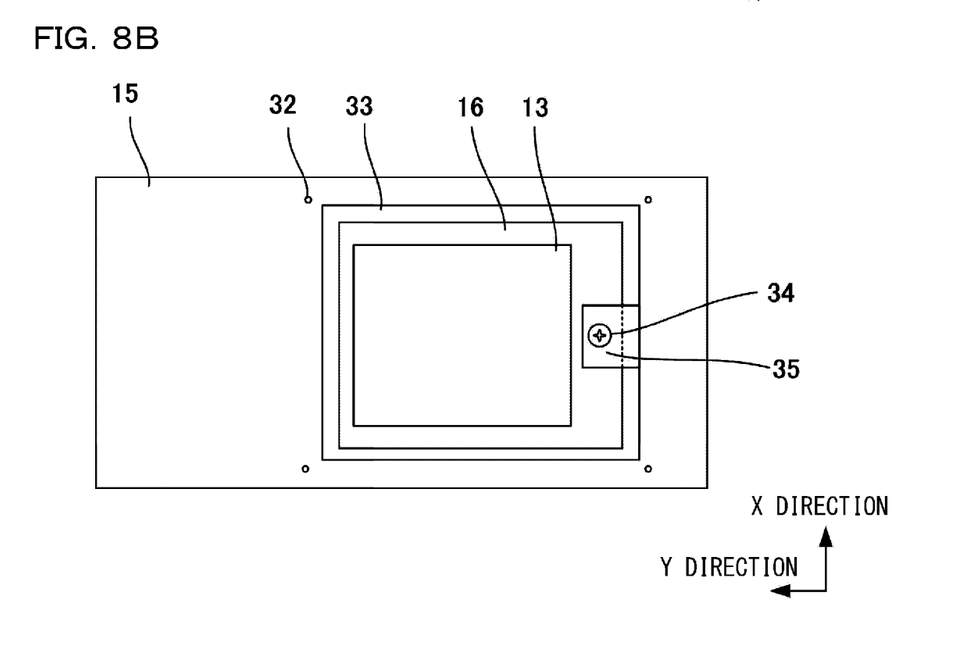

FIG. 8A and FIG. 8B are diagrams of the head section 1 viewed from the top surface side. As described above, it is desirable that the posture of the image sensor 13 satisfies the Scheimpflug condition. Therefore, a posture adjusting hole 33 is provided on the top surface of the housing 15 of the head section 1. As shown in FIG. 8A, the posture adjusting hole 33 is covered by a lid 50. The lid 50 is fixed to the housing 15 by a fixing tool such as four screws 31. The four screws 31 are respectively screwed into four screw holes 32 provided on the housing 15.

When the lid 50 is removed from the housing 15 and the interior of the housing 15 is viewed from the posture adjusting hole 33, a substrate including the image sensor 13 can be seen as shown in FIG. 8B. The substrate including the image sensor is supported by the supporting member 16. A posture adjusting screw 34 is screwed into a screw hole of a holding section 35 fixed to the housing 15.

Figure 9A:
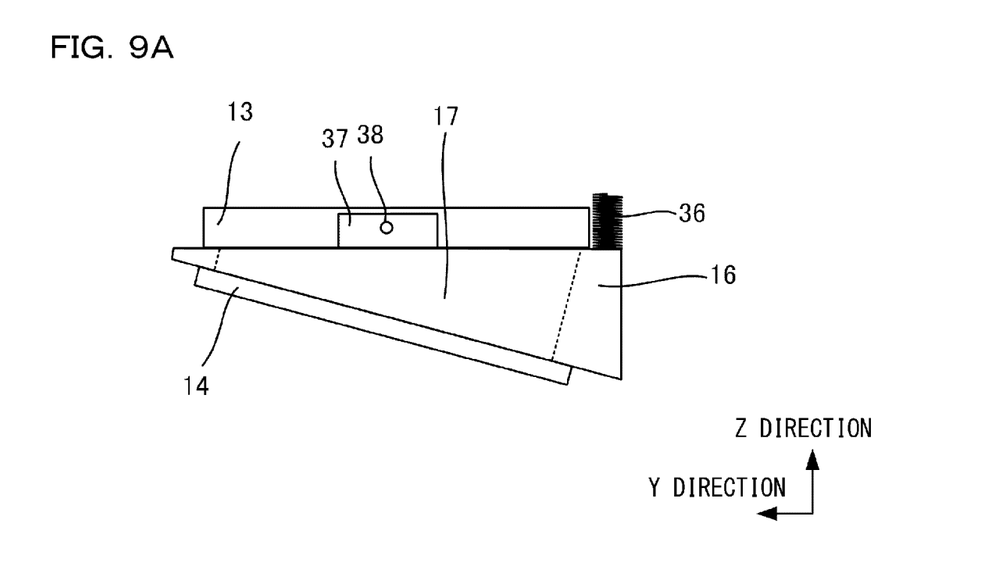
FIGS. 9A and 9B each is a diagram illustrating a posture adjusting mechanism.

As shown in FIG. 9A, the supporting member 16 has a holding member 37 which holds both ends of the image sensor 13. FIG. 9A shows one holding member 37. However, another holding member 37 exists on the other side sandwiching the image sensor 13. A supporting pin 38 is provided on the holding member 37. The supporting pin 38 is rotatably fitted into a hole provided on the housing 15. That is, the supporting pin 38 serves as a rotation axis for adjusting the posture of the image sensor 13. The rotation axis exists so as to pass through the center of the image sensor 13.

Figure 9B:
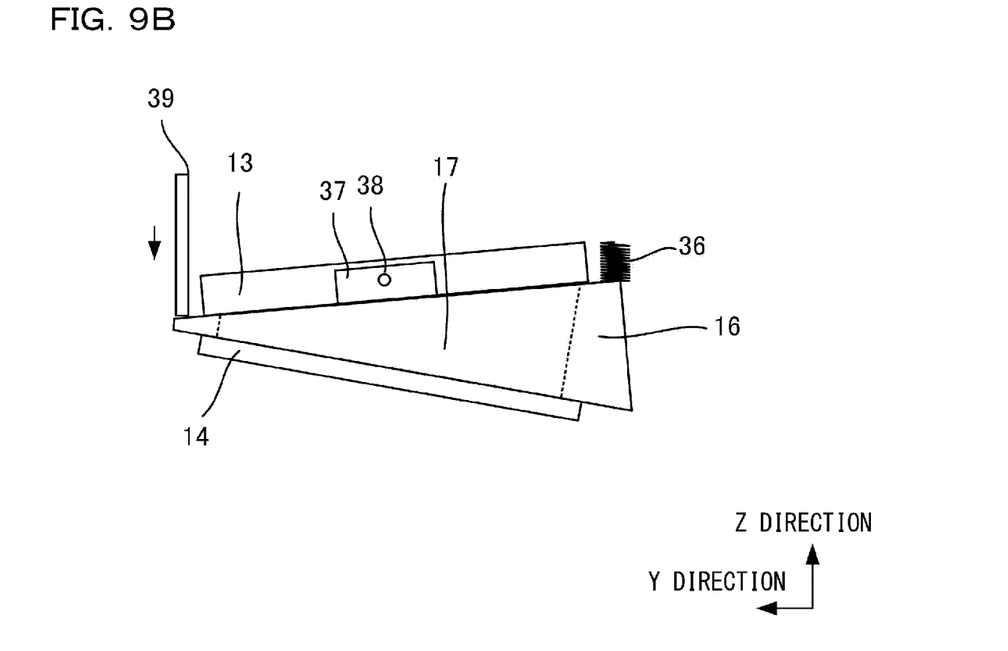

As can be understood from FIG. 9A and FIG. 9B, one end of an elastic member 36 is in contact with or coupled to a rear end side of the supporting member 16. The other end of the elastic member 36 is in contact with or coupled to the housing 15. As shown in FIG. 9B, a tip end of a micrometer 39 which is inserted from the posture adjusting hole 33 pushes a tip end side of the supporting member 16. As a result, the image sensor 13 rotates counterclockwise together with the supporting member 16 around the supporting pin 38 as a rotation axis. In this way, the posture of the image sensor 13 is adjusted. When the image sensor 13 rotates counterclockwise, the elastic member 36 is pushed up by the rear end side of the supporting member 16 and contracts. On the other hand, when the image sensor 13 rotates clockwise, the elastic member 36 pushes down the rear end side of the supporting member 16. The elastic member 36 may be a rubber or a spring. A person in charge of assembly rotates the micrometer 39 while checking the image acquired by the image sensor 13. In this way, the postures of the supporting member 16 and the image sensor 13 are adjusted such that the image sensor 13 satisfies the Scheimpflug condition.

SUMMARY

[Viewpoint 1]

As shown in FIG. 1, the optical displacement meter 100 is an example of an optical displacement meter of a light sectioning method that measures a profile of the X-Z cross section of a measuring object conveyed in the Y direction based on the principle of triangulation. The light source 6 is an example of a light source that irradiates the measuring object (the workpiece W) with the slit light L1 parallel to both the X direction and the Z direction. Further, the light source 6 is an example of a light source that irradiates the measuring object with slit light having a width in the X direction. The image sensor 13 is an image sensor that receives the reflected light L2 from the measuring object via the light receiving lens 12. The image sensor 13 has a plurality of pixels two-dimensionally arranged in the U direction corresponding to the X direction and the V direction corresponding to the Z direction, and outputs a light receiving amount of the reflected light by the plurality of pixels. As shown in FIG. 7, etc., the cover glass 14 functions as a cover glass which is arranged separated from the image sensor 13 and is arranged obliquely relative to the light receiving surface of the image sensor. The housing 15 functions as a housing which houses the image sensor 13 and the cover glass 14. The peak detecting section 26 functions as a detecting unit that detects, as a peak position, a position of a pixel in the V direction that is a peak of the light receiving amount for each of the plurality of pixel rows arranged in the U direction. The profile generating section 27 functions as a generating unit that generates a profile of the X-Z cross section from each position of the plurality of pixel rows in the U direction and the peak position in the V direction.

As described above, since the cover glass 14 is arranged obliquely relative to the light receiving surface of the image sensor 13, multiple reflection light is less likely to occur. As a result, an erroneous measurement of the measuring object is suppressed in the optical displacement meter of the light sectioning method.

[Viewpoint 2]

The image sensor 13 and the light receiving lens 12 are arranged so as to form a Scheimpflug optical system. That is, the image sensor 13, the light receiving lens 12, and an optical axis of the slit light L1 are arranged so as to form a Scheimpflug optical system. As a result, the image I1 in which various positions of the workpiece W are in focus is generated. As shown in the image I1 of FIG. 3, when a plurality of reflected lights L2 reflected at different reflection positions (the height of the workpiece W) form an image on the light receiving surface, the width of the peak spot becomes substantially constant. As a result, the peak position can be specified with a high accuracy, and thus the measurement accuracy of the height of the workpiece W is improved.

[Viewpoint 3]

The supporting member 16 functions as a sealing member that seals the cover glass 14 and the light receiving surface of the image sensor 13. This makes it difficult for dust and the like to enter the light receiving surface of the image sensor 13.

[Viewpoint 4]

The supporting member 16 that functions as a sealing member may be a wedge-shaped supporting member which is arranged between the image sensor 13 and the cover glass 14 and supports the cover glass 14. This makes it possible to stably support the cover glass 14 arranged obliquely relative to the image sensor 13.

[Viewpoint 5]

As described with reference to FIG. 6B, the housing 15 may function as a sealing member. This makes it possible to achieve a dustproof function and a reduction in multiple reflection with a simple structure.

[Viewpoint 6]

The light receiving lens 12 functions as a light receiving lens that makes the reflected light L2 from the measuring object form an image on the light receiving surface of the image sensor 13. As shown in FIG. 7, an incident surface of the cover glass 14 on which the reflected light L2 is incident is orthogonal to the optical axis of the light receiving lens 12. That is, the incident surface of the cover glass 14 is arranged parallel to the main surface of the light receiving lens 12.

[Viewpoint 7]

FIG. 8B, FIG. 9A, and FIG. 9B show an adjusting mechanism that adjusts the posture of the image sensor 13. The posture adjusting hole 33 is provided on, among a plurality of surfaces forming the housing 15, a surface (top surface) facing a rear surface of the image sensor 13, and functions as an opening for a person in charge of adjustment to access the adjusting mechanism. The lid 50 functions as a removable lid member which closes the opening. As a result, the person in charge of adjustment can easily adjust the posture of the image sensor 13.

The housing 15 may function as a housing that houses the image sensor 13 in a sealed state. That is, no cover glass is provided between the image sensor 13 and the light receiving lens 12. In this case, the cover glass 14 can be omitted, and multiple reflection can be reduced. Moreover, the intrusion of dust can be reduced.

The invention is not limited to the above embodiment, and various modifications and/or changes are possible within the scope of the gist of the invention.

What is claimed is:

1. An optical displacement meter of a light sectioning method which measures a profile of an X-Z cross section of a measuring object conveyed in a Y direction based on a principle of triangulation, the optical displacement meter comprising:

a light source which irradiates the measuring object with slit light having a width in an X direction;

an image sensor that receives reflected light from the measuring object via a light receiving lens, the image sensor having a plurality of pixels two-dimensionally arranged in a U direction corresponding to the X direction and a V direction corresponding to a Z direction, and outputting a light receiving amount of the reflected light by the plurality of pixels;

a cover glass which is arranged separated from the image sensor and is arranged obliquely relative to a light receiving surface of the image sensor;

a housing which houses the image sensor and the cover glass;

a detecting unit which detects, as a peak position, a position of a pixel in the V direction that is a peak of the light receiving amount for each of a plurality of pixel rows arranged in the U direction; and a generating unit which generates a profile of the X-Z cross section from each position of the plurality of pixel rows in the U direction and the peak position in the V direction.

2. The optical displacement meter according to claim 1, wherein the image sensor, the light receiving lens, and an optical axis of the slit light are arranged so as to form a Scheimpflug optical system.

3. The optical displacement meter according to claim 1, further comprising a sealing member which seals the cover glass and the light receiving surface of the image sensor.

4. The optical displacement meter according to claim 3, wherein the sealing member is a wedge-shaped supporting member which is arranged between the image sensor and the cover glass and supports the cover glass.

5. The optical displacement meter according to claim 3, wherein the sealing member is the housing.

6. The optical displacement meter according to claim 1, wherein the cover glass is orthogonal to an optical axis of the light receiving lens.

7. The optical displacement meter according to claim 1, further comprising:

an adjusting mechanism which adjusts a posture of the image sensor;

an opening provided on, among a plurality of surfaces forming the housing, a surface facing a rear surface of the image sensor for a person in charge of adjustment to access the adjusting mechanism; and a removable lid member which closes the opening.

* * * * *